United States Patent
Lamontia et al.

(10) Patent No.: US 11,006,685 B2
(45) Date of Patent: May 18, 2021

(54) HAND AND FOOT HEATERS

(71) Applicant: DUPONT ELECTRONICS, INC., Wilmington, DE (US)

(72) Inventors: Mark Allan Lamontia, Landenberg, PA (US); Mehrdad Mehdizadeh, Avondale, PA (US); Michael R. Moseley, New Castle, DE (US)

(73) Assignee: DUPONT ELECTRONICS, INC. DE (US)

( * ) Notice: Subject to any disclaimer, the term of this patent is extended or adjusted under 35 U.S.C. 154(b) by 240 days.

(21) Appl. No.: 16/057,154

(22) Filed: Aug. 7, 2018

(65) Prior Publication Data

US 2019/0216147 A1     Jul. 18, 2019

Related U.S. Application Data

(60) Provisional application No. 62/618,309, filed on Jan. 17, 2018.

(51) Int. Cl.
| | |
|---|---|
| *H05B 1/02* | (2006.01) |
| *A41D 19/015* | (2006.01) |
| *A41B 11/00* | (2006.01) |
| *A41D 1/00* | (2018.01) |
| *A41D 13/005* | (2006.01) |
| *B32B 1/00* | (2006.01) |
| *B32B 27/40* | (2006.01) |
| *H05B 3/34* | (2006.01) |
| *A41D 31/102* | (2019.01) |

(52) U.S. Cl.
CPC ........ *A41D 19/01535* (2013.01); *A41B 11/00* (2013.01); *A41D 1/002* (2013.01); *A41D 13/0051* (2013.01); *B32B 1/00* (2013.01); *B32B 27/40* (2013.01); *H05B 3/342* (2013.01); *A41D 31/102* (2019.02); *A41D 2400/10* (2013.01); *B32B 2255/10* (2013.01); *B32B 2255/26* (2013.01); *B32B 2437/02* (2013.01); *H05B 2203/017* (2013.01)

(58) Field of Classification Search
CPC .............. A41D 19/01535; A41D 1/002; A41D 13/0051; A41D 2400/22; A41B 11/00; B23B 1/00; B23B 2255/10; B23B 1/26; B23B 3/38; H05B 3/342; H05B 2203/017; H05B 1/0272; H05B 2203/013
USPC ....... 219/211, 212, 504, 505, 543, 544, 545, 219/546

See application file for complete search history.

(56) References Cited

U.S. PATENT DOCUMENTS

| | | | |
|---|---|---|---|
| 2001/0042746 A1* | 11/2001 | Tanaka | H05B 3/141 219/541 |
| 2008/0047955 A1* | 2/2008 | Rock | A41D 31/065 219/545 |

(Continued)

*Primary Examiner* — Mark H Paschall

(57) ABSTRACT

This invention provides gloves and socks containing printed heaters. The glove or sock with a heater comprises a glove or sock, a substrate with the outline of the glove or sock, and a heater printed on the substrate wherein the substrate is laminated to the glove or sock. The heater comprises two printed conductive bus bars with extensions traversing the substrate and an array of printed resistive areas arranged so that each area is between and overlaps and is contiguous to two conductors, one of which is one of the bus bars or its extensions and the second is the other bus bar or its extensions.

14 Claims, 1 Drawing Sheet

(56) References Cited

U.S. PATENT DOCUMENTS

| | | | |
|---|---|---|---|
| 2008/0189826 A1* | 8/2008 | Dilli | A41D 19/01535 2/158 |
| 2010/0051604 A1* | 3/2010 | Davidov | H05B 3/34 219/488 |
| 2016/0095369 A1* | 4/2016 | Roberts | A41D 19/01535 2/160 |
| 2018/0169994 A1* | 6/2018 | Burwell | A41D 1/002 |

* cited by examiner

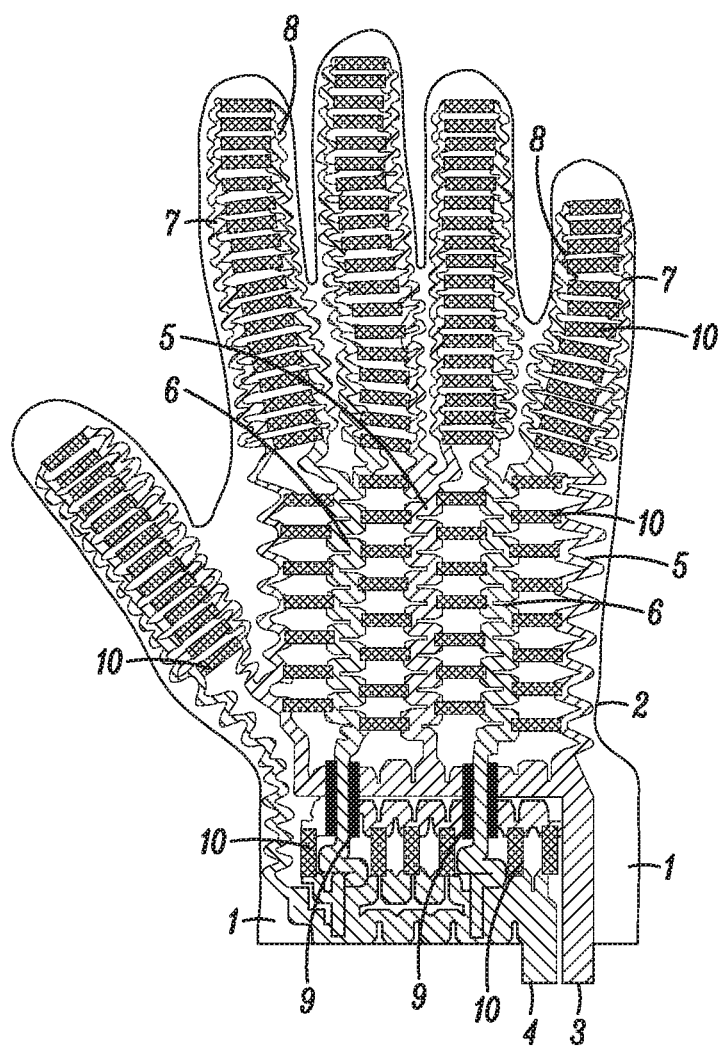

HAND AND FOOT HEATERS

FIELD OF THE INVENTION

This invention is directed to printable hand and foot heaters.

BACKGROUND OF THE INVENTION

There is increasing interest in providing a variety of heatable wearable garments. Among those are gloves with heaters to warm the wearer's hands and footwear with heaters to warm the wearer's feet. Currently typical commercialized heated garments are heated by resistance wires. These wires have the disadvantage that the presence of the wires renders the garments uncomfortable.

An alternative is to use heaters with printed components which would provide greater comfort to the wearer. In one such version, a component of the heated garment is one or more areas of resistive material, e.g., carbon, which serve as the resistive heating element. between two bus bars. An additional problem with heaters in hand wear and footwear is the strain to which they are subjected during their use and and during donning and doffing. There is a need for such heaters for hand wear and footwear.

SUMMARY OF THE INVENTION

This invention provides a glove with a heater, comprising:
a) a glove comprising a cuff surrounding the wrist, a palm and the back of the hand connected to the cuff and separate sheaths for each finger and thumb, wherein the sheaths extend from the palm and the back of the hand;
b) a substrate with the outline of the glove and with an area corresponding to the cuff of the glove, an area corresponding to the back of the hand of the glove and areas corresponding to the sheaths of the glove; and
c) a heater printed onto the substrate, the heater comprising:
 i) two printed conductive bus bars on the area corresponding to the cuff of the glove, wherein each bus bar has printed conductive extensions that traverse the area corresponding to the back of the hand of the glove such that a conductive extension of one bus bar traverses one side of each area corresponding to a sheath of the glove and a conductive extension of the other bus bar traverses the opposite side of each area corresponding to a sheath of the glove; and
 ii) an array of printed resistive material areas arranged so that each printed resistive material area is between and overlaps and is contiguous to two conductors, one of which is one of the bus bars or its extensions and the second is the other bus bar or its extensions, and with spaces of exposed substrate between adjacent resistive material areas, wherein the sheet resistance $R_s$ of the resistive material is between 10 and 50,000 Ω/square,
wherein the substrate with the printed heater is laminated to the outside or the inside of the glove such that the cuff of the glove is laminated to the corresponding area of the substrate, the back of the hand of the glove is laminated to the corresponding area of the substrate and the sheaths are laminated to the corresponding areas of the substrate.

In addition, this invention provides a glove with a heater, comprising:
a) a glove comprising a cuff surrounding the wrist, a palm and the back of the hand connected to the cuff and separate sheaths for each finger and thumb, wherein the sheaths extend from the palm and the back of the hand;
b) a substrate with the outline of the glove and with an area corresponding to the cuff of the glove, an area corresponding to the palm of the glove and areas corresponding to the sheaths of the glove; and
c) a heater printed onto the substrate, the heater comprising:
 i) two printed conductive bus bars on the area corresponding to the cuff of the glove, wherein each bus bar has printed conductive extensions that traverse the area corresponding to the palm of the glove such that a conductive extension of one bus bar traverses one side of each area corresponding to a sheath of the glove and a conductive extension of the other bus bar traverses the opposite side of each area corresponding to a sheath of the glove; and
 ii) an array of printed resistive material areas arranged so that each printed resistive material area is between and overlaps and is contiguous to two conductors, one of which is one of the bus bars or its extensions and the second is the other bus bar or its extensions and with spaces of exposed substrate between adjacent resistive material areas, wherein the sheet resistance $R_s$ of the resistive material is between 10 and palm of 50,000 Ω/square,
wherein the substrate with the printed heater is laminated to the outside or the inside of the glove such that the cuff of the glove is laminated to the corresponding area of the substrate, the palm of the glove is laminated to the corresponding area of the substrate and the sheaths are laminated to the corresponding areas of the substrate.

In another embodiment, this invention provides a glove with a heater, comprising:
a) a glove comprising a cuff surrounding the wrist, a palm and the back of the hand connected to the cuff and separate sheaths for each finger and thumb, wherein the sheaths extend from the palm and the back of the hand;
b) a substrate comprising an area corresponding to the cuff of the glove and an area corresponding to the palm of the glove; and
c) a heater printed onto the substrate, the heater comprising:
 i) two printed conductive bus bars on the area corresponding to the cuff of the glove, wherein each bus bar has a printed conductive extension that traverses the area corresponding to the palm of the glove such that a conductive extension of one bus bar traverses one side of the area corresponding to the palm of the glove and a conductive extension of the other bus bar traverses the opposite side of the area corresponding to the palm of the glove; and
 iii) one or more printed resistive material areas arranged so that each printed resistive material area is between and overlaps and is contiguous to the two printed conductive extensions one from each bus bar on the area corresponding to the palm of the glove, wherein the sheet resistance $R_s$ of the resistive material is between 10 and 50,000 Ω/square,
wherein the substrate with the printed heater is laminated to the outside or the inside of the glove such that the cuff of the glove is laminated to the corresponding area of the substrate and the palm of the glove is laminated to the corresponding area of the substrate.

In still another embodiment, this invention provides a glove with a heater, comprising:

a) a glove comprising a cuff surrounding the wrist, a palm and the back of the hand connected to the cuff and separate sheaths for each finger and thumb, wherein the sheaths extend from the palm and the back of the hand;
b) a substrate comprising an area corresponding to the cuff of the glove and an area corresponding to the back of the hand of the glove; and
c) a heater printed onto the substrate, the heater comprising:
  i) two printed conductive bus bars on the area corresponding to the cuff of the glove, wherein each bus bar has a printed conductive extension that traverses the area corresponding to the back of the hand of the glove such that a conductive extension of one bus bar traverses one side of the area corresponding to the back of the hand of the glove and a conductive extension of the other bus bar traverses the opposite side of the area corresponding to the back of the hand of the glove; and
  ii) one or more printed resistive material areas arranged so that each printed resistive material area is between and overlaps and is contiguous to the two printed conductive extensions one from each bus bar on the area corresponding to the back of the hand of the glove, wherein the sheet resistance $R_s$ of the resistive material is between 10 and 50,000 $\Omega$/square, wherein the substrate with the printed heater is laminated to the outside or the inside of the glove such that the cuff of the glove is laminated to the corresponding area of the substrate and the back of the hand of the glove is laminated to the corresponding area of the substrate.

The invention also provides a method for preparing a glove with a heater, the method comprising:
a) providing a glove comprising a cuff surrounding the wrist, a palm and the back of the hand connected to the cuff and separate sheaths for each finger and thumb, wherein the sheaths extend from the palm and the back of the hand;
b) stretching the glove up to 130% in all directions on a stretcher to provide a stretched cuff, stretched palm and back of the hand and stretched sheaths and maintain the glove in the stretched state, wherein the amount of stretching along the lengths of the sheaths is at least as great or greater than that in other directions;
c) providing a substrate with the outline of the stretched glove and with a cuff area corresponding to the cuff of the stretched glove, a back of the hand area corresponding to the back of the hand of the stretched glove and sheath areas corresponding to the sheaths of the stretched glove;
d) printing a heater onto the substrate, comprising:
  1) printing two conductive bus bars on the area corresponding to the cuff of the glove;
  2) printing conductive extensions from each bus bar, the conductive extensions traversing the area corresponding to the back of the hand of the glove such that a conductive extension of one bus bar traverses one side of each area corresponding to a sheath of the glove and a conductive extension of the other bus bar traverses the opposite side of each area corresponding to a sheath of the glove; and
  3) printing an array of resistive material areas arranged so that each printed resistive material area is between and overlaps and is contiguous to two conductors, one of which is one of the bus bars or its extensions and the second is the other bus bar or its extensions and with spaces of exposed substrate between adjacent resistive material areas, wherein the sheet resistance $R_s$ of the resistive material is between 10 and 50,000 $\Omega$/square;
e) laminating the substrate to the back of the stretched glove such that the cuff of the stretched glove is laminated to the corresponding area of the substrate, the back of the hand of the stretched glove is laminated to the corresponding area of the substrate and the sheaths of the stretched glove are laminated to the corresponding areas of the substrate; and
f) removing the glove from the stretcher.

In addition, the invention provides a method for preparing a glove with a heater, the method comprising:
a) providing a glove comprising a cuff surrounding the wrist, a palm and the back of the hand connected to the cuff and separate sheaths for each finger and thumb, wherein the sheaths extend from the palm and the back of the hand;
b) stretching the glove up to 130% in all directions on a stretcher to provide a stretched cuff, stretched palm and back of the hand and stretched sheaths and maintain the glove in the stretched state, wherein the amount of stretching along the lengths of the sheaths is at least as great or greater than that in other directions;
c) providing a substrate with the outline of the stretched glove and with a cuff area corresponding to the cuff of the stretched glove, a palm area corresponding to the palm of the stretched glove and sheath areas corresponding to the sheaths of the stretched glove;
d) printing a heater onto the substrate, comprising:
  1) printing two conductive bus bars on the area corresponding to the cuff of the glove;
  2) printing conductive extensions from each bus bar, the conductive extensions traversing the area corresponding to palm of the glove such that a conductive extension of one bus bar traverses one side of each area corresponding to a sheath of the glove and a conductive extension of the other bus bar traverses the opposite side of each area corresponding to a sheath of the glove; and
  3) printing an array of resistive material areas arranged so that each printed resistive material area is between and overlaps and is contiguous to two conductors, one of which is one of the bus bars or its extensions and the second is the other bus bar or its extensions and with spaces of exposed substrate between adjacent resistive material areas, wherein the sheet resistance $R_s$ of the resistive material is between 10 and 50,000 $\Omega$/square;
e) laminating the substrate to the palm of the stretched glove such that the cuff of the stretched glove is laminated to the corresponding area of the substrate, the palm of the stretched glove is laminated to the corresponding area of the substrate and the sheaths of the stretched glove are laminated to the corresponding areas of the substrate; and
f) removing the glove from the stretcher.

BRIEF DESCRIPTION OF THE FIGURE

The FIGURE shows an embodiment of a printed heater on a substrate with the outline of a glove.

DETAILED DESCRIPTION OF THE INVENTION

The invention relates to printed heaters for use in gloves and footwear. The same concepts are used in forming these heaters.

The glove with the heater comprises a glove, a substrate, and a heater printed onto the substrate.

The glove comprises the typical parts of a glove—a cuff surrounding the wrist, a palm and the back of the hand connected to the cuff and separate sheaths for each finger and thumb.

The substrate is a flat piece of material with the outline of the glove. The substrate has an area corresponding to the cuff of the glove, an area corresponding to the back of the hand of the glove or the palm of the glove and areas corresponding to the sheaths of the glove. The material must be compatible with printing of the heater components. In one embodiment the substrate material is thermoplastic polyurethane.

A heater is printed onto the substrate. The heater comprises two printed conductive bus bars on the area corresponding to the cuff of the glove. Each bus bar has printed conductive extensions that traverse the area corresponding to the back of the glove or the palm of the glove such that a conductive extension of one bus bar traverses one side of each area corresponding to a sheath of the glove and a conductive extension of the other bus bar traverses the opposite side of each area corresponding to a sheath of the glove. The bus bars and the extensions may be printed at the same time.

In some embodiments the bus bars and extensions are in the form of straight lines or a combination of straight lines on the areas corresponding to the cuff and the back of the hand of the glove or the palm of the glove and slightly curved lines following the outlines of the areas corresponding to the sheaths of the glove. In another embodiment, at least some of the bus bars and extensions are in the form of serpentines, i.e., wavelike, undulating. In one such embodiment essentially all the bus bars and extensions are in the form of serpentines. The serpentines are designed to have the largest amplitude of undulation consistent with the available space. The serpentines accommodate the large strains that occur in the finger, sheath areas, during the use of the glove and in the cuff and back of the hand or palm areas. The serpentines also allow for stretching during the donning and doffing of the gloves.

The heater also comprises resistive material areas that serve as the heating elements. An array of the printed resistive material areas is arranged so that each printed resistive material area is between and overlaps and is contiguous to two conductors, one of which is one of the bus bars or its extensions and the second is the other bus bar or its extensions. There are high strain areas at the major knuckles at the base of the fingers where the area corresponding to the back of the glove attaches to the areas corresponding to the sheaths. There is also a high strain area between the area corresponding to the thumb sheath and the area corresponding to the adjacent finger sheath. In an embodiment, these high strain areas are devoid of printed resistive material areas. There is also a relatively high strain area at the minor knuckles in the midfingers. In one embodiment these areas are also devoid of printed resistive material areas.

Each resistive material area has a cross-section orthogonal to the distance, i.e., the length of the area, between the two contiguous conductive bus bars or extensions. These dimensions maybe different for resistive material areas on different areas of the glove. In order for a resistive material area to provide uniform heating the cross-section should be uniform along the length of the resistive material area. In one embodiment the resistive material areas are in the form of rectangles. In another embodiment some of the resistive material area s are in the form of serpentines.

There is exposed substrate in spaces between adjacent resistive material areas. If the substrate is breathable then the heater has the additional advantage of being breathable so that air and moisture, i.e., water vapor, can pass through the exposed regions of the permeable substrate in the spaces between adjacent resistive material areas. This can provide additional comfort to the wearer. If the substrate is not breathable portions of the exposed substrate between adjacent resistive material areas are removed to render the heater breathable and provide extra stretchability. These areas may be removed in any case to provide extra stretchability.

In one embodiment, the resistive material has sheet a resistance $R_s$ of between 10 and 50,000 Ω/square. In another embodiment, the resistive material has sheet a resistance $R_s$ of between 200 and 5000 Ω/square.

In some embodiments, the printed conductive bus bars and extensions are silver bus bars and extensions and the printed resistive material is carbon. In other embodiments, the printed bus bars and extensions are copper bus bars and extensions and the printed resistive material is carbon. In still other embodiments, the printed conductive bus bars and extensions are silver-silver chloride, gold or aluminum.

The electrically conductive areas and bus bars referred to herein are formed from polymer thick film pastes containing an electrical conductor. When the printed conductive bus bars and extensions are silver, they are formed using polymer thick film silver pastes. The resistive material is also printed using a polymer thick film paste. When the printed resistive material is printed carbon, it is formed using a polymer thick film carbon paste. When using polymer thick film pastes, the polymer is an integral part of the final composition, i.e., the bus bars, the extensions or the resistive areas.

The FIGURE shows an embodiment of a printed heater on a substrate 1 with the outline 2 of a glove. The heater comprises two printed conductive bus bars 3 and 4 on the area corresponding to the cuff of the glove. Bus bar 3 has printed conductive extensions 5 and bus bar 4 has printed conductive extensions 6 that traverse the area corresponding to the back of the glove of the glove. Extensions 5 and 6 have further extensions. Extensions 5 have further conductive extensions 7 that traverse one side of each area corresponding to a sheath of the glove and extensions 6 have further conductive extensions 8 that traverse the opposite side of each area corresponding to a sheath of the glove. Both bus bars 3 and 4 are shown as a combination of straight lines and serpentines. The extensions 5, 6, 7 and 8 are in the form of serpentines. The dielectric areas 9 insulate the bus bar 3 from the extensions 6. The heater also comprises resistive material areas 10 that serve as the heating elements. An array of the printed resistive material areas 10 is arranged so that each printed resistive material area is between and overlaps and is contiguous to two conductors, one of which is one of the bus bars 3 or its extensions 5 or 7 and the second is the other bus bar 4 or its extensions 6 or 8.

The substrate with the printed heater is laminated to the outside or the inside of the glove. The substrate can be laminated to the palm or to the back of the hand of the glove. Because of the expected additional use of the palm of the glove as compared to the back of the glove and the additional wear and strain on the printed heater components, it is believed a more robust heater will be provided if the heater is laminated to the back of the hand of the glove, i.e., such that the cuff of the glove is laminated to the corresponding area of the substrate, the back of the hand of the glove is laminated to the corresponding area of the substrate, and the sheaths are laminated to the corresponding areas of the substrate.

In embodiments in which the substrate is laminated to the outside of the glove, this glove may be used as the inside glove or liner of a two-glove pair with a second glove as the outside glove of the pair. The second glove covers and protects the heater on the outside of the inner glove. In other embodiments involving a two-glove pair, the substrate may be laminated to the inside of the outer glove.

The invention also provides a method for making a glove as described above. The glove may be stretched up to 130% in all directions with the amount of stretching along the lengths of the sheaths being at least as great or greater than that in other directions. When the glove is stretched, the outline of the substrate is the outline of the stretched glove.

The same concepts are used in forming heaters for socks as in forming heaters for gloves.

A sock with a heater comprises a sock, a substrate, and a heater printed onto the substrate.

The sock comprises the typical parts of a sock, a portion surrounding the ankle and part of the calf of the leg and a top of the foot and a bottom of the foot connected to the portion surrounding the ankle and part of the calf. The top of the foot and the bottom of the foot extend to the portions covering the toes.

The substrate is a flat piece of material with the outline of the sock. The substrate has an area corresponding to the portion of the sock surrounding the ankle and part of the calf of the leg, an area corresponding to the top of the foot of the sock. The material must be compatible with printing of the heater components. In one embodiment the substrate material is thermoplastic polyurethane.

A heater is printed onto the substrate. The heater comprises two printed conductive bus bars on top of the area corresponding to the portion of the sock surrounding the ankle and part of the calf of the leg. Each bus bar has printed conductive extensions that traverse the area corresponding to the top of the foot such that a conductive extension of one bus bar traverses one side of each area corresponding to a toe of the foot and a conductive extension of the other bus bar traverses the opposite side of each area corresponding to a toe of the foot. The bus bars and the extensions may be printed at the same time.

In some embodiments the bus bars and extensions are in the form of straight lines or a combination of straight lines on the areas corresponding to the ankle and the back of the foot of the sock and slightly curved lines following the outlines of the toes. In another embodiment, at least some of the bus bars and extensions are in the form of serpentines, i.e., wavelike, undulating. In one such embodiment essentially all the bus bars and extensions are in the form of serpentines. The serpentines are designed to have the largest amplitude of undulation consistent with the available space. The serpentines accommodate the large strains that occur in the area of the ankle and the areas of the toes. The serpentines also allow for stretching during the putting on and doffing of the socks.

The heater also comprises resistive material areas that serve as the heating elements. An array of the printed resistive material areas is arranged so that each printed resistive material area is between and overlaps and is contiguous to two conductors, one of which is one of the bus bars or its extensions and the second is the other bus bar or its extensions.

Each resistive material area has a cross-section orthogonal to the distance, i.e., the length of the area, between the two contiguous conductive bus bars or extensions. In order for the area to provide uniform heating this cross-section should be uniform along the length of the resistive material area.

There is exposed substrate in spaces between adjacent resistive material areas. If the substrate is breathable than the heater has the additional advantage of being breathable in the sense that air and moisture, i.e., water vapor, can pass through the exposed regions of the permeable substrate in the spaces between adjacent resistive material areas. This can provide additional comfort to the wearer. If the substrate is not breathable portions of the exposed substrate between adjacent resistive material areas are removed to render the heater breathable and provide extra stretchability. These areas may be removed in any case to provide extra stretchability.

In one embodiment, the resistive material has sheet a resistance $R_s$ of between 10 and 50,000 $\Omega$/square. In another embodiment, the resistive material has sheet a resistance $R_s$ of between 200 and 5000 $\Omega$/square.

In some embodiments, the printed conductive bus bars and extensions are silver bus bars and extensions and the printed resistive material is carbon. In other embodiments, the printed bus bars and extensions are copper bus bars and extensions and the printed resistive material is carbon. In still other embodiments, the printed conductive bus bars and extensions are silver-silver chloride, gold or aluminum.

The electrically conductive areas and bus bars referred to herein are formed from polymer thick film pastes containing an electrical conductor. When the printed conductive bus bars and extensions are silver, they are formed using polymer thick film silver pastes. The resistive material is also printed using a polymer thick film paste. When the printed resistive material is printed carbon, it is formed using a polymer thick film carbon paste. When using polymer thick film pastes, the polymer is an integral part of the final composition, i.e., the bus bars, the extensions or the resistive areas.

EXAMPLE

A printed heater on a substrate that can be used as a glove liner for a heated glove was prepared essentially with the configuration shown in the FIGURE.

A sheet of lamentable thermoplastic substrate (TPU) (Bemis ST604 obtained from Bemis Corp., Shirley, Mass.) was used for the substrate upon which the heater was printed. The components of the heater were sequentially screen printed onto the substrate along with the outline of a 115% stretched cotton glove, i.e., a glove stretched 15% above its normal size. The pastes used for the screen printing were DuPont™ Intexar™ PE 874 Conductive Silver paste, DuPont™ ME 775 Crossover Dielectric paste, and DuPont™ Intexar™ PE 671 Stretchable Carbon Conductor (all obtained from DuPont Co., Wilmington, Del.). Optionally, DuPont™ Intexar™ PE773 Stretchable Encapsulant paste (DuPont Co., Wilmington, Del.) may also be used before and after printing the dielectric paste. The conductive inks were patterned onto the flexible substrate using typical screen printing practices. After each printing, the printed film was exposed to 130° C. for 8 minutes. The silver printing and the carbon printing were each repeated in order to achieve the desired properties.

As shown in the FIGURE the glove liner was fabricated with 119 identical printed resistive carbon rectangular areas, each of which serves as a heater. These individual heaters were wired in parallel. The individual heaters were 3.59 mm wide. Between the connecting conductive traces, they were 11.68 mm long. This ratio of length to width gives an individual heater a resistance equal to 3.25 times the sheet resistance of the carbon. Since each of the 119 tiles had identical dimensions, the overall resistance of the heater was $3.25 \times R_{carbon}/119$, where $R_{carbon}$ is the sheet resistance of the carbon. The overall resistance of the conductors was empirically determined to be $65 \times R_{silver}$, where $R_{silver}$ is the sheet resistance of the silver conductors. Under the testing conditions of stretch & heat, the materials used in the fabrication of Example 1 had the following sheet resistances:

$R_{carbon}$=4900 Ω/square $R_{silver}$=0.062 Ω/square and the heated glove liner showed a total resistance of approximately 140Ω.

The glove liner was encapsulated using a flexible TPU sheet cover which was bonded to the glove liner using nip roll lamination.

24 volts DC was applied to the glove liner's terminals while it was worn on a hand with no insulating shell. After 20 seconds, the individual heaters closest to the user's skin were observed to be at 37° C. Individual heaters that were not in good contact with the user (due to wrinkles in the glove liner) were observed to be up to 52° C. since the user's body rapidly conducts heat away from the individual heaters in good contact.

24V DC was applied to the glove liner when it was not worn on a hand. The individual heaters were observed to be at a more uniform 45-53° C.

What is claimed is:

1. A glove with a heater, comprising:
a) a glove comprising a cuff surrounding the wrist, a palm and the back of the hand connected to the cuff, and separate sheaths for each finger and thumb, wherein the sheaths extend from the palm and the back of the hand;
b) a substrate with the outline of the glove and with an area corresponding to the cuff of the glove, an area corresponding to the back of the hand of the glove, and areas corresponding to the sheaths of the glove; and
c) a heater printed onto the substrate, the heater comprising:
  i) two printed conductive bus bars on the area corresponding to the cuff of the glove, wherein each bus bar has printed conductive extensions that traverse the area corresponding to the back of the hand of the glove such that a conductive extension of one bus bar traverses one side of each area corresponding to a sheath of the glove and a conductive extension of the other bus bar traverses the opposite side of each area corresponding to a sheath of the glove; and
  ii) an array of printed resistive material areas arranged so that each printed resistive material area is between and overlaps and is contiguous to two conductors, one of which is one of the bus bars or its extensions and the second is the other bus bar or its extensions and with spaces of exposed substrate between adjacent resistive material areas, wherein the sheet resistance $R_s$ of the resistive material is between 10 and 50,000 Ω/square,
wherein the substrate with the printed heater is laminated to the outside or the inside of the glove such that the cuff of the glove is laminated to the corresponding area of the substrate, the back of the hand of the glove is laminated to the corresponding area of the substrate, and the sheaths of the glove are laminated to the corresponding areas of the substrate.

2. The glove with a heater of claim 1, wherein the substrate with the printed heater is laminated to the outside of the glove on the back of the hand.

3. The glove with a heater of claim 1, wherein the substrate with the printed heater is laminated to the inside of the glove on the back of the hand.

4. The glove with a heater of claim 1, wherein the high strain areas between the area corresponding to the back of the hand of the glove and the areas corresponding to the sheaths of the gloves and between the area corresponding to the thumb sheath and the area corresponding to the adjacent finger sheath are devoid of printed resistive areas.

5. The glove with a heater of claim 1, wherein at least some of the printed conductive bus bars and the printed conductive extensions are serpentine in shape.

6. The glove with a heater of claim 1, wherein each resistive material area has a cross-section orthogonal to the distance between the two contiguous conductive bus bars or extensions that is an essentially uniform cross-section along the length of the resistive material area.

7. The glove with a heater of claim 1, wherein the sheet resistance $R_s$ of the resistive material is between 200 and 5000 Ω/square.

8. The glove with a heater of claim 1, wherein the substrate is breathable.

9. The glove with a heater of claim 1, wherein portions of the exposed substrate between adjacent resistive material areas are removed to render the heater breathable and foster extra stretchability.

10. The glove with a heater of claim 1, wherein the conductive printed bus bars and extensions are silver bus bars and extensions and the printed resistive material is carbon.

11. The glove with a heater of claim 1, wherein the conductive printed bus bars and extensions are copper bus bars and extensions and the printed resistive material is carbon.

12. A glove with a heater, comprising:
a) a glove comprising a cuff surrounding the wrist, a palm and the back of the hand connected to the cuff and separate sheaths for each finger and thumb, wherein the sheaths extend from the palm and the back of the hand;
b) a substrate with the outline of the glove and with an area corresponding to the cuff of the glove, an area corresponding to the palm of the glove, and areas corresponding to the sheaths of the glove; and
c) a heater printed onto the substrate, the heater comprising:
  i) two printed conductive bus bars on the area corresponding to the cuff of the glove, wherein each bus bar has printed conductive extensions that traverse the area corresponding to the palm of the glove such that a conductive extension of one bus bar traverses one side of each area corresponding to a sheath of the glove and a conductive extension of the other bus bar traverses the opposite side of each area corresponding to a sheath of the glove; and
  ii) an array of printed resistive material areas arranged so that each printed resistive material area is between and overlaps and is contiguous to two conductors, one of which is one of the bus bars or its extensions and the second is the other bus bar or its extensions, and with spaces of exposed substrate between adjacent resistive material areas, wherein the sheet resistance $R_s$ of the resistive material is between 10 and 50,000 Ω/square, wherein the substrate with the printed heater is laminated to the outside or the inside of the glove such that the cuff of the glove is laminated to the corresponding area of the substrate, the palm of the glove is laminated to the corresponding area of the substrate and the sheaths of the glove are laminated to the corresponding areas of the substrate.

13. A glove with a heater, comprising:
a) a glove comprising a cuff surrounding the wrist, a palm and the back of the hand connected to the cuff and separate sheaths for each finger and thumb, wherein the sheaths extend from the palm and the back of the hand;
b) a substrate comprising an area corresponding to the cuff of the glove and an area corresponding to the palm of the glove; and
c) a heater printed onto the substrate, the heater comprising:
   i) two printed conductive bus bars on the area corresponding to the cuff of the glove, wherein each bus bar has a printed conductive extension that traverses the area corresponding to the palm of the glove such that a conductive extension of one bus bar traverses one side of the area corresponding to the palm of the glove and a conductive extension of the other bus bar traverses the opposite side of the area corresponding to the palm of the glove; and
   ii) one or more printed resistive material areas arranged so that each printed resistive material area is between and overlaps and is contiguous to the two printed conductive extensions, one from each bus bar on the area corresponding to the palm of the glove, wherein the sheet resistance $R_s$ of the resistive material is between 10 and 50,000 Ω/square,
wherein the substrate with the printed heater is laminated to the outside or the inside of the glove such that the cuff of the glove is laminated to the corresponding area of the substrate and the palm of the glove is laminated to the corresponding area of the substrate.

14. A glove with a heater, comprising:
a) a glove comprising a cuff surrounding the wrist, a palm and the back of the hand connected to the cuff and separate sheaths for each finger and thumb, wherein the sheaths extend from the palm and the back of the hand;
b) a substrate comprising an area corresponding to the cuff of the glove and an area corresponding to the back of the hand of the glove; and
c) a heater printed onto the substrate, the heater comprising:
   i) two printed conductive bus bars on the area corresponding to the cuff of the glove, wherein each bus bar has a printed conductive extension that traverses the area corresponding to the back of the hand of the glove such that a conductive extension of one bus bar traverses one side of the area corresponding to the back of the hand of the glove and a conductive extension of the other bus bar traverses the opposite side of the area corresponding to the back of the hand of the glove; and
   ii) one or more printed resistive material areas arranged so that each printed resistive material area is between and overlaps and is contiguous to the two printed conductive extensions one from each bus bar on the area corresponding to the back of the hand of the glove, wherein the sheet resistance $R_s$ of the resistive material is between 10 and 50,000 Ω/square,
wherein the substrate with the printed heater is laminated to the outside or the inside of the glove such that the cuff of the glove is laminated to the corresponding area of the substrate, and the back of the hand of the glove is laminated to the corresponding area of the substrate.

* * * * *